UNITED STATES PATENT OFFICE.

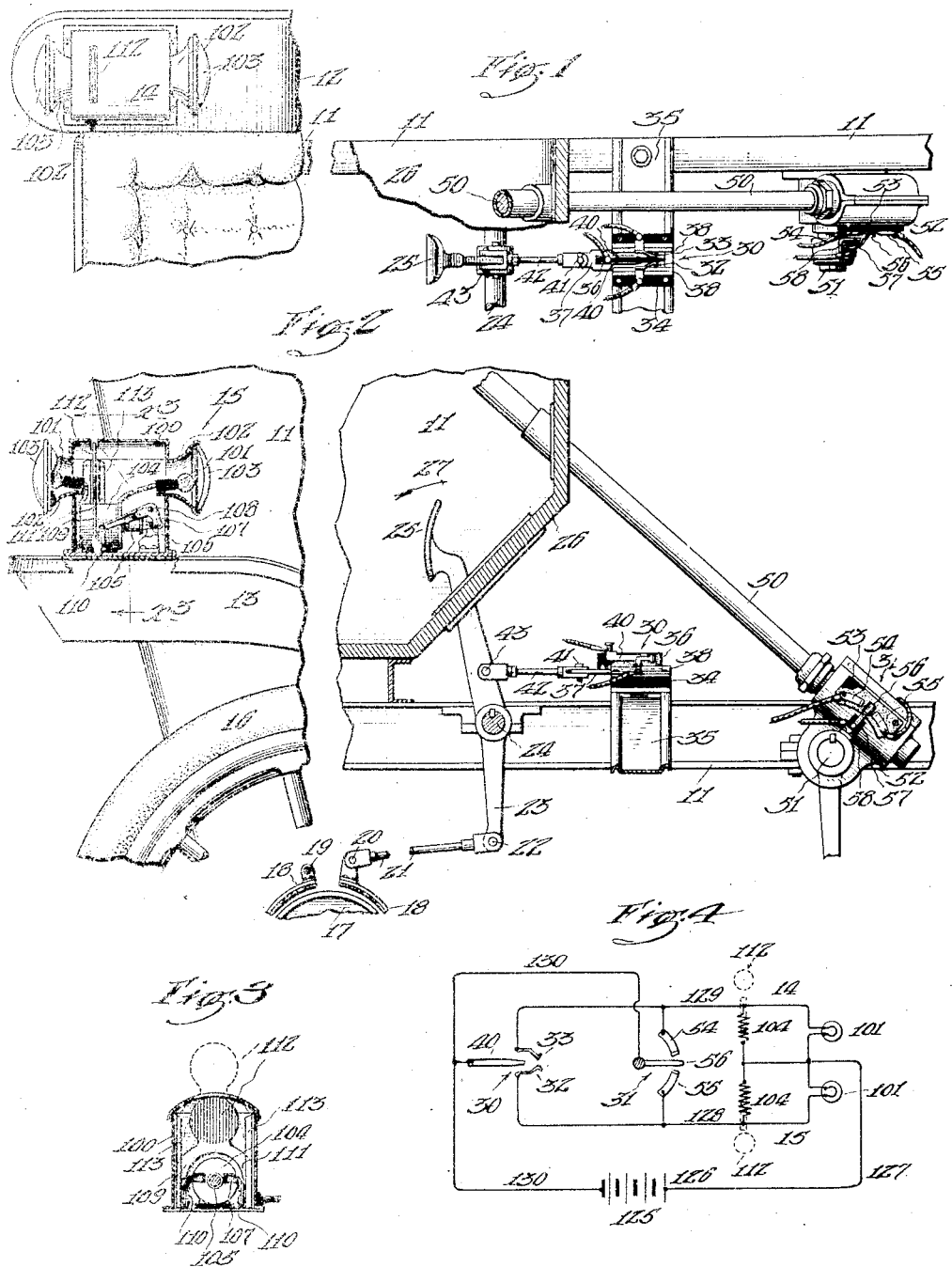

PETER McLAREN, OF WHITTIER, CALIFORNIA.

AUTOMOBILE-SIGNAL.

1,164,832.  Specification of Letters Patent.  Patented Dec. 21, 1915.

Application filed February 24, 1915. Serial No. 10,349.

*To all whom it may concern:*

Be it known that I, PETER McLAREN, a subject of the King of Great Britain, residing at Whittier, in the county of Los Angeles, State of California, have invented a new and useful Automobile-Signal, of which the following is a specification.

My invention relates to the signaling art, and the first object of the invention is to provide a signal which may be placed on any sort of a conveyance, such as an automobile, or other vehicle, boat, airship, or the like, for the purpose of indicating to other conveyances a proposed change in direction or diminution of speed of the conveyance upon which the signals are placed.

A second object of the invention is to provide means whereby the signals may be actuated from the retarding means of the conveyance.

More specifically, a third object is to provide an automobile or other conveyance with signals arranged on either side thereof, and to provide means whereby the signals on one side may be displayed when the automobile is turned to the right and whereby the signals on the other side may be displayed when the vehicle is turned to the left.

A fourth object of the invention is to provide means whereby all the signals mentioned above may be displayed when the brake or retarding means of the automobile or conveyance is applied, or whereby all the signals mentioned above may be displayed just before the brake is applied.

The fifth object of the invention is to provide mechanism whereby the third and fourth objects mentioned above may be simultaneously accomplished, all the signals being displayed when the brake is applied or just before the brake is applied, the signals on one side remaining displayed if the steering means is turned during the time the brake is applied.

While the invention is shown applied to an automobile and controlled electrically, and while a specific form of signal is illustrated and described, my invention has a broader application than this and it must be understood that it can be applied to any sort of a body, the direction and speed of which are human controlled, and that it can be actuated either electrically or mechanically, and that various types of signal other than that specifically illustrated may be employed in the invention.

A specific form and application of my invention is illustrated in the drawing in which—

Figure 1 is a plan view showing that form of my invention applied to portions of an automobile, certain parts of the automobile being broken away or shown in section for the purpose of making the operation and construction of the invention more plain. Fig. 2 is an elevation, similarly illustrated, of this embodiment of my invention. Fig. 3 is a section through the specific signal shown in Fig. 2 on the plane $x^3$—$x^3$ of Fig. 2. Fig. 4 is a diagram of connections of a preferred method of connecting the signals.

In these drawings, 11 is an automobile having rear fenders 12 and 13 on which are placed signals 14 and 15. Each of the rear wheels 16 is provided with a brake pulley 17 surrounded by a band brake 18, one end of which is fixed to a pin 19 suitably secured to the frame of the machine, and the other end of which is secured by a pin 20 to an actuating rod 21 which extends forward and is pivoted on a pin 22 secured in the brake lever 23. The brake lever 23 is fixed to a brake lever shaft 24 and is provided with a pedal 25 which projects through the floor 26 of the automobile and which is operated by pressing forwardly thereon in the direction of the arrow 27.

For the purpose of actuating the signals 14 and 15 a brake switch 30 and a steering switch 31 are provided. The brake switch 30 consists of a pair of stationary brake contacts 32 and 33 which are mounted on an insulating block 34 which is fixed to a cross member 35 of the frame of the automobile. A fiber block 36 is mounted on a metal plate 37 which slides in metal guides 38 secured to the insulating block 34. The fiber block 36 carries a movable brake contact 40. The metal plate 37 is secured by means of a pin 41 to a rod 42 which is secured by a pin 43 to the brake lever 23, the rod 43 being adjustable as to length so that the relative position of the contact 40 and the brake lever 23 can be varied as will hereinafter be explained. The relation of the parts is such that when the pedal 25 is pressed in the direction of the arrow 27 the contact 40 is forced into simultaneous engagement with both of the contacts 32 and 33.

According to the usual practice the automobile is provided with a steering column 50, this column being connected through a worm gear and segment with the steering shaft 51. The worm gear and segment are located in a case 52, to the side of which is secured a fiber block 53, this fiber block carrying stationary steering contacts 54 and 55. A movable steering contact 56 is mounted on a fiber block 57 secured by means of a metal 58 to the steering shaft 51, the relation of the parts being such that the movable steering contact 56 is centrally located between the stationary contacts 54 and 55 when the wheels of the automobile are pointing straight ahead.

The signals 14 and 15 are exact duplicates of each other and consist of a casing 100 which may be provided if desired with suitable doors, not shown, to give access to the interior thereof. Electric lamps 101 are located in projections 102 formed on either end of the casing 100, these projections being provided with glass members 103 which may be plain or colored as desired. A solenoid 104 is secured in the bottom of the casing 100 and is provided with a core 105 which is connected by means of a short insulated link 106 to the short end of a forked lever 107. The lever is mounted on a pin 108 carried in a suitable support, and has two ends 109 which extend down on either side of the solenoid 104 and connect by means of short links 110 with forked ends 111 of a disk 112. The edges of the disk 112 slide between guides 113 fixed on the inside of the casing 100. One of the lights 101 may be omitted if desired so that the illuminated signal can be seen only from the rear or front of the automobile.

The method of connecting the apparatus is shown in Fig. 4, in which a battery 125 has one terminal 126 connected by means of a wire 127 with one terminal of both lamps 101 and one terminal of both solenoids 104. The other terminal of one of the lamps 101 and one of the solenoids 104 is connected by means of a wire 128 with the stationary steering contact 55 and the stationary brake contact 32. The other terminals of the other solenoid 104 and the other lamp 101 is connected through a wire 129 with the stationary steering contact 54 and the stationary brake contact 33. The movable steering contact 56 and the movable brake contact 40 are connected through the wire 130 with the opposite terminal of the battery 125.

The method of operation of the invention is as follows: The parts being in the position shown in the drawing and the automobile moving in a forward direction, the operator starts to apply his brakes by pressing downwardly on the pedal 25. The rod 42 is so adjusted that before any considerable application of the brake takes place the movable brake contact 40 contacts with the stationary brake contacts 32 and 33, thus establishing a circuit through both of the solenoids 104 and the lamps 101. When the current flows through either of the solenoids 104 the core 105 is attracted and the lever 107 is rotated in such a manner as to lift the disk 112 into the position shown in dotted lines in Fig. 3, in which position it is plainly visible to vehicles which may be following. At the same time circuit is established through all the lamps 101 so that light is thrown out through the glass members 103, these also being plainly visible. The operator then continues to press downwardly on the pedal 25 thereby applying the brake and stopping the vehicle. A skilful operator will display his signals a little before applying his brake so as to give following vehicles plenty of warning. When the operator releases his brake for the purpose of going ahead the movable brake contact 40 is drawn out of engagement with the stationary brake contacts 32 and 33 and the circuit is opened, the display 112 dropping into the casing 100 and the lamps 101 being extinguished. When the driver desires to turn the vehicle in either direction he turns the steering wheel, turning the steering column 50 and turning the steering shaft 51 to one side or the other of the center, thereby making contact between the movable steering contact 56 and one or the other of the stationary steering contacts 54 or 55. This establishes a circuit through only one of the solenoids 104 and only one of the sets of lamps 101, thus indicating that the vehicle is going to turn to one side or the other. The signal is displayed and the lamp is lighted until the steering wheel is turned back to the central position, thus causing the movable steering contact 56 to break circuit, the signal resuming its original position. Should the operator apply his brake thus displaying both of his signals and thereafter operate his steering wheel to turn in either direction both of the signals will first be displayed, one of the signals remaining up after the brake is released so that another vehicle can at once ascertain the intention of the driver.

I claim as my invention:

1. An automobile signal comprising a casing having an open slot in the top thereof, a signal disk having forked ends at the lower end thereof, guides secured to the inside of said casing in such a position as to guide the forked ends of the signal disk in such a manner that the signal disk may be raised through said slot into a position where it is visible, and electro-magnetic means in said casing for so raising said disk.

2. An automobile signal comprising a casing having an open slot in the top thereof, a signal disk having forked ends at the lower end thereof, guides secured to the inside of said casing in such a position as to guide the forked ends of the signal disk in such a manner that the signal disk may be raised through said slot into a position where it is visible, a lever pivoted on a pin carried in a suitable support inside said casing, means for connecting one arm of said lever to said signal disk, and electro-magnetic means for causing said lever to lift said disk.

3. An automobile signal comprising a casing having an open slot in the top thereof, a signal disk having forked ends at the lower end thereof, guides secured to the inside of said casing in such a position as to guide the forked ends of the signal disk in such a manner that the signal disk may be raised through said slot into a position where it is visible, a lever pivoted on a pin carried in a suitable support inside said casing, and having forked ends extending to either side of said casing and near said disk, short links connecting said forked ends of said lever with said disk, and electro-magnetic means for actuating said lever to raise said disk.

4. An automobile signal comprising a casing having an open slot in the top thereof, a signal disk having forked ends at the lower end thereof, guides secured to the inside of said casing in such a position as to guide the forked ends of the signal disk in such a manner that the signal disk may be raised through said slot into a position where it is visible, a lever pivoted on a pin carried in a suitable support inside said casing, and having forked ends extending to either side of said casing and near said disk, short links connecting said forked ends of said lever with said disk, a solenoid located inside said forked ends of said disk, a core in said solenoid, and means for so connecting said core to said lever that the magnetic pull of said solenoid on said core will cause said lever to raise said disk.

In testimony whereof, I have hereunto set my hand at Los Angeles, California, this 18th day of February, 1915.

PETER McLAREN.

In presence of—
FRED A. MANSFIELD,
FORD W. HARRIS.